United States Patent
Roman et al.

(10) Patent No.: US 12,373,479 B2
(45) Date of Patent: *Jul. 29, 2025

(54) SYSTEMS AND METHODS FOR DOCUMENT DEVIATION DETECTION

(71) Applicant: Thomson Reuters Enterprise Centre GmbH, Zug (CH)

(72) Inventors: Elizabeth Roman, Somerville, MA (US); Hella-Franziska Hoffmann, London (GB); Josh Lemaitre, Ipswich, MA (US); Nikolai Nefedov, Gattikon (CH); David Von Rickenbach, Baar (CH)

(73) Assignee: Thomson Reuters Enterprise Centre GmbH, Zug (CH)

( * ) Notice: Subject to any disclaimer, the term of this patent is extended or adjusted under 35 U.S.C. 154(b) by 0 days.

This patent is subject to a terminal disclaimer.

(21) Appl. No.: 18/338,309

(22) Filed: Jun. 20, 2023

(65) Prior Publication Data

US 2023/0409623 A1    Dec. 21, 2023

Related U.S. Application Data

(63) Continuation of application No. 16/407,385, filed on May 9, 2019, now Pat. No. 11,681,735.

(60) Provisional application No. 62/669,021, filed on May 9, 2018.

(51) Int. Cl.
*G06F 16/36* (2019.01)
*G06F 16/334* (2025.01)
*G06F 16/93* (2019.01)

(52) U.S. Cl.
CPC .......... *G06F 16/367* (2019.01); *G06F 16/334* (2019.01); *G06F 16/93* (2019.01)

(58) Field of Classification Search
CPC ....... G06F 16/367; G06F 16/334; G06F 16/93
See application file for complete search history.

(56) References Cited

U.S. PATENT DOCUMENTS

| | | | |
|---|---|---|---|
| 7,519,607 B2 | 4/2009 | Anderson | |
| 2005/0010863 A1* | 1/2005 | Zernik | G06F 40/131 715/229 |
| 2012/0179961 A1* | 7/2012 | Stollman | G06F 40/30 715/243 |
| 2017/0039176 A1* | 2/2017 | Broderick | G06F 40/186 |

OTHER PUBLICATIONS

1st Examination Report for Australia Patent Application No. 2023200183 dated Dec. 19, 2023 (3 pages).

(Continued)

*Primary Examiner* — Hau H Hoang
(74) *Attorney, Agent, or Firm* — Alston & Bird LLP (57) ABSTRACT

The present disclosure is directed towards systems and methods for detecting deviations from a standard document in a document being analyzed. The inventive systems and methods include performing a first level analysis to detect portions of a standard that are identical to, similar to, deleted from, and added to a document being evaluated. A second level analysis may be applied to those portions of the standard that are similar, but not identical to, portions of the document being evaluated to assist a user in identifying similarities and differences between the two portions of text.

8 Claims, 5 Drawing Sheets

(56) References Cited

OTHER PUBLICATIONS

Crochemore et al., "*A Parallel Algorithm for Fixed-length Approximate String-matching with k-mismatches*", Algorithms and Applications, Springer, Berlin, Heidelberg, 2010 pp. 92-101.
Asad Sayeed et al: "Characteristics of document similarity measures for compliance analysis", ACM 18th International Conference on Information and Knowledge Management, CIKM 2009; Nov. 2, 2009 to Nov. 6, 2009; Hong Kong, ACM—Association for Computing Machinery, Hong-Kong, China, dated Nov. 2, 2009.
Marco Lippi et al: "CLAUDETTE: An Automated Detector of Potentially Unfair Clauses in Online Terms of Service", arxiv.org, Cornell University Library, 201 Olin Library Cornell University.
International Search Report and Written Opinion for Application No. PCT/IB2019/053830 dated Sep. 10, 2019.
1$^{st}$ Examination Report for New Zealand Application No. 769429 dated Nov. 5, 2021 (4 pages).
Examiner's Report for Canadian Application No. 3,098,644 dated Jan. 20, 2022 (4 pages).
Office Action for European Application No. 19732455.1 dated Mar. 15, 2022 (6 pages).
2$^{nd}$ Patent Examination Report for NZ Patent Application No. 769429 dated Jun. 1, 2022 (8 pages).
Wikipedia, API [retrieved from Internet Jun. 28, 2022] https:/en.wikipedia.org/wiki/API (14 pages).
LibFLASM: a software library for fixed-length approximate string matching written by Lorraine A.K. Ayad (hereinafter Ayad), Bioinformatics (2016) 17:454 (Year: 2016).
Decision to Refuse a European Patent Application for EP Application No. 19732455.1 dated Sep. 19, 2023 (16 pages).

\* cited by examiner

Standard Clause excerpt:

For Breach. If one of us materially breaches any of our representations, warranties, covenants or agreements in this Agreement or an SOW or otherwise fails to perform any of our material obligations in this Agreement or an SOW, the other party can send a written notice advising of the breach or failure and providing a 10 business day period for the breach or failure to be cured.

Actual clause with highlights depicting the similarity score to the above standard clause sentence.

Sec. 2 - This Agreement will start on the Commencement Date and subject to the provisions of this Agreement will continue until 31st December 200( ( "the Agreement Year " unless terminated earlier in accordance with the terms of Clause 8 of this Agreement. Sec. 8 - This section should be read in conjunction with Condition 8 of Schedule 8 for the duration and renewal of the Scheme 8.1 Without prejudice to its rights either party may terminate this Agreement forthwith if 8.1.1 the other party is in breach of any of its obligations under this Agreement and if such a breach is capable of remedy the party has failed to remedy the breach within fourteen days of receipt of a notice specifying the breach requiring its remedy or such longer period as may be specified in the notice 8.1.2 the defaulting party enters into a composition with its creditors or enters into liquidation or a resolution is passed ( other than for the purposes of bona fide reconstruction or amalgamation not involving insolvency or an order is made for the winding - up of the defaulting party or an Administrator or Administrative Receiver is appointed over all or any part of its assets of the defaulting party takes or suffers any similar action in consequence of debt or 8.1.3 either party fails to pay any premium or any amount of an account thereof due hereunder on or by the due date of payment .

SYSTEMS AND METHODS FOR DOCUMENT DEVIATION DETECTION

CROSS-REFERENCE TO RELATED APPLICATIONS

This application is a continuation of U.S. patent application Ser. No. 16/407,385, filed May 9, 2019, which claims the benefit of and priority to U.S. Provisional Application No. 62/669,021, filed May 9, 2018, both of which are hereby incorporated by reference in their entireties.

This application for letters patent disclosure document describes inventive aspects that include various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

BACKGROUND

The present innovations generally address tools for detecting deviations among documents. On a high-level, deviation detection typically involves identifying dissimilarities between two text documents. Dissimilarities in the text can occur on many levels including in the lexicon of words, semantics and context, grammatical structure as well as in logical differences such as negations.

One practical application of these concepts is in the review of legal contracts and the differences between the clauses that they contain. For example, during negotiation lawyers often may need to look at redlined changes from a counterparty and determine whether those are acceptable or not. During an acquisition of a company, for example, due diligence often needs to be performed on a large set of contracts to determine risks and deviations from standard contract templates of the acquiring company.

Today, deviation detection is being performed manually by legal practitioners which is a very time-consuming process that often leads to inconsistent results. Accordingly, there remains a need for systems and methods to reduce the burden and improve the accuracy of detecting deviations between documents.

In order to develop a reader's understanding of the innovations, disclosures have been compiled into a single description to illustrate and clarify how aspects of these innovations operate independently, interoperate as between individual innovations, and/or cooperate collectively. The application goes on to further describe the interrelations and synergies as between the various innovations; all of which is to further compliance with 35 U.S.C. § 112.

BRIEF SUMMARY

The present invention provides a system and method for detecting deviations between a standard document and another document that is being evaluated.

In one aspect, a method for detecting one or more deviations in a document comprises extracting text from a first document to be analyzed, extracting one or more facts from the first document, including at least a document type, abstracting one or more groupings of text from the first document, receiving a standard document based on the type of the first document, performing a first level deviation analysis on the standard document and the first document including at least one of long string matching and textual similarity mapping to obtain an identification of any identical groupings of text, any similar groupings of text, any groupings of text that have been deleted from the standard in the first document and any groupings of text that have been added to the standard in the first document, and performing a second level deviation analysis on any similar groupings of text that are identified to obtain similarity data indicating a degree to which a text grouping from the standard document is similar to a grouping of text from the first document.

In some implementations, the first level deviation analysis includes long string matching.

In some implementations, the long string matching analysis includes identifying strings of text longer than or equal to a predetermined minimum number of words that are present in both a text grouping of the standard and a text grouping of the first document, with less than or equal to a maximum number of mismatched words within the otherwise matching string.

In some implementations, the long string matching analysis includes identifying strings of text in the first document that match sentences in the standard, with less than or equal to a maximum number of mismatched words within the otherwise matching string.

In some implementations, the first level deviation analysis includes textual similarity mapping.

In some implementations, the textual similarity mapping analysis includes tokenizing a text grouping from the standard and a text grouping from the first document and evaluating token overlap weighted by token importance.

In some implementations, the second level deviation analysis includes tokenizing a text grouping from the standard and a text grouping from the first document and obtaining a shared token ratio based on a comparison of a number of shared tokens between the text grouping from the standard and the text grouping from the first document and a number of unique tokens among the text grouping from the standard and the text grouping from the first document.

In some implementations, the second level analysis includes forming Ngrams from a text grouping from the standard and a text grouping from the first document, where n is greater than one, and comparing a number of shared Ngrams between the text grouping from the standard and the text grouping from the first document.

In some implementations, the second level deviation analysis includes tokenizing a text grouping from the standard and a text grouping from the first document, generating semantically similar representations of groups of one or more tokens from the text grouping from the standard and the text grouping from the first document through consultation of a language model and comparing semantically similar representations of tokens in the text grouping from the standard and the text grouping from the first document.

In some implementations, the method further comprises providing a visual comparison result to a user in which the text grouping form the standard and the text grouping from the first document are presented to the user and in which token groups in the first document are shaded with a shade density that reflects a level of similarity between those token groups and token groups in the standard as determined by the second level deviation analysis.

In some implementations, the second level deviation analysis includes extracting triples from a text grouping from the standard and a text grouping from the first document, compare the extracted triples by comparing the three ordered elements of the triples extracted from the text grouping from the first document to the three ordered elements of the triples extracted from the text grouping from the standard.

In some implementations, the second level deviation analysis includes determining a part of speech for each word in the text groupings from the standard and the text groupings from the first document, determining a dependency tree for each text grouping based on the parts of speech of each word in the text grouping, and comparing a dependency tree of the text grouping form the standard against a dependency tree of the text grouping from the first document.

In some implementations, the method further comprises replacing at least one word in each text grouping with a logical statement based that word's role in a dependency tree and comparing the text grouping from the standard after logical statement replacement against the text grouping from the first document after logical statement replacement.

In some implementations, the standard is received in a playbook that also includes at least one text grouping representing an acceptable deviation from the standard and the method further includes performing at least one of a first level and second level deviation analysis to compare the at least one text grouping representing an acceptable deviation from the standard against a text grouping of the first document.

BRIEF DESCRIPTION OF THE DRAWINGS

The accompanying drawings illustrate various non-limiting, example, innovative aspects in accordance with the present descriptions:

FIG. 3 shows an exemplary screenshot of a sentence embedding analysis according to an embodiment.

DETAILED DESCRIPTION

Embodiments of systems and methods detecting deviations among documents are described herein. While aspects of the described systems and methods can be implemented in any number of different configurations, the embodiments are described in the context of the following exemplary configurations. The descriptions and details of well-known components and structures are omitted for simplicity of the description, but would be readily familiar to those having ordinary skill in the art.

The description and figures merely illustrate exemplary embodiments of the inventive systems and methods. It will thus be appreciated that those skilled in the art will be able to devise various arrangements that, although not explicitly described or shown herein, embody the principles of the present subject matter. Furthermore, all examples recited herein are intended to be for illustrative purposes only to aid the reader in understanding the principles of the present subject matter and the concepts contributed by the inventors to furthering the art, and are to be construed as being without limitation to such specifically recited examples and conditions. Moreover, all statements herein reciting principles, aspects, and embodiments of the present subject matter, as well as specific examples thereof, are intended to encompass all equivalents thereof.

In general, the systems and methods described herein may relate to improvements to aspects of using computers to detect deviations among documents. These improvements not only improve the functioning of how such a computer (or any number of computers employed in detecting deviations among documents) is able to operate to serve the user's document analysis goals, but also improves the accuracy, efficiency and usefulness of the deviation detection results that are returned to the user. The inventive detection tools described herein generally are configured to receive a reference document or standard from a user and to compare the reference document or standard to the text of other documents to detect deviations in those other documents from the reference document or standard.

The tools described herein are particularly suited to legal documents and are generally discussed in that context, however it will be appreciated that many other types of documents, texts and users will benefit from the inventive tools disclosed and claimed herein.

The concept of a standard is very important for contract deviation detection. The standard may be in the form of a playbook which may define a set of clauses which need to be included in each contract type and a standard language for these clauses. In addition, a playbook may contain acceptable deviations for the clauses. A standard may also come in the form of a contract template, for example from Practical Law, a product of Thomson Reuters. A playbook may also contain a prose summary of the standard language. The clauses in the standard may then compared one by one (or in groupings) with any corresponding clause or clauses in a given contract being analyzed.

The present systems and methods have many uses and several are detailed in this disclosure. For example, a relatively junior first level reviewer may be tasked with analyzing a contract that is under active negotiation. The systems and methods proposed herein aid the reviewer in analyzing changes made to the contract being negotiated and flags deviations from a standard. The systems and methods may also be configured to determine which deviations, if any, might be acceptable through a comparison of the contract being analyzed to a corpus of acceptable deviations from the standard or from previously executed contracts. In such an embodiment, data may be provided describing how often a particular deviation has previously been accepted. Accordingly, contract negotiation may be accelerated and improved knowing what deviations were previously found acceptable. In addition, such data may provide a basis to adapt the standard if the standard is consistently deviated from in a particular aspect.

In another example, another relatively junior first level review may be tasked with performing due diligence review of a company's various previously executed contracts. The systems and methods proposed herein may be configured to aid the reviewer in flagging deviations in the contracts to be reviewed from a contract standard. Again, the systems and methods may be configured to determine and indicate which deviations, if any, might be acceptable. In addition, statistical data may be obtained from the systems and methods proposed herein that describe deviations by contract, type of contract, type of clause, degree of deviation, etc. In another aspect, if a deviation is detected in a document being reviewed that is similar to a deviation that was previously encountered, a prose summary of the deviation that was previously used to describe that type of deviation may be provided to the junior reviewer for their inclusion or adaptation in a deviation report that they draft in order to improve consistency and efficiency in their work product.

In another example, a more senior review manager may be tasked with overseeing the due diligence review of a large number of contracts. In this scenario, the systems and methods proposed herein may be configured to analyze the entire number of contracts to flag potential deviations from a standard and may provide overall statistics to the manager indicating the relative frequency, severity and/or types of deviations present in the contracts. The systems and methods may be further configured to group the contracts under review into groupings according to the types of deviations present in the contracts. Accordingly, subsequent review of the contracts may be batched or split up amongst reviewers so that a subsequent reviewer is tasked with reviewing deviations of a similar type, increasing the efficiency of the subsequent review.

Documents to be analyzed may be ingested according to a format in which they are received. For example, if a document to be analyzed is in PDF form, a text extraction or optical character recognition ("OCR") tool may be employed to obtain digital text from PDF page images. If a document to be analyzed is in Microsoft Word form, for example, the text of the document may be isolated from any formatting markup. The text of a document may then be analyzed to extract facts about the document, in the example of a contract document extracted facts may include, for example, the type of contract, parties to the contract, the effective date of the contract, etc. The identification of the type of contract that is to be analyzed may be used as a basis for determining which playbook or standard it will be compared to.

The text of a document may then also be analyzed to separate the document's text into labeled groupings for comparison to similar groupings in a document standard. Groupings may contain one or more sentences, and even one or more paragraphs. In one example, groupings may be limited to one sentence each. In another example, in a contract document, for example, the text of the contract may be separated and labeled based on the clauses of the contract, such as the "termination" clause, the "assignment" clause, etc. Several existing tools are capable of performing these preliminary steps, including, for example, a product named eBrevia.

Figure 1:
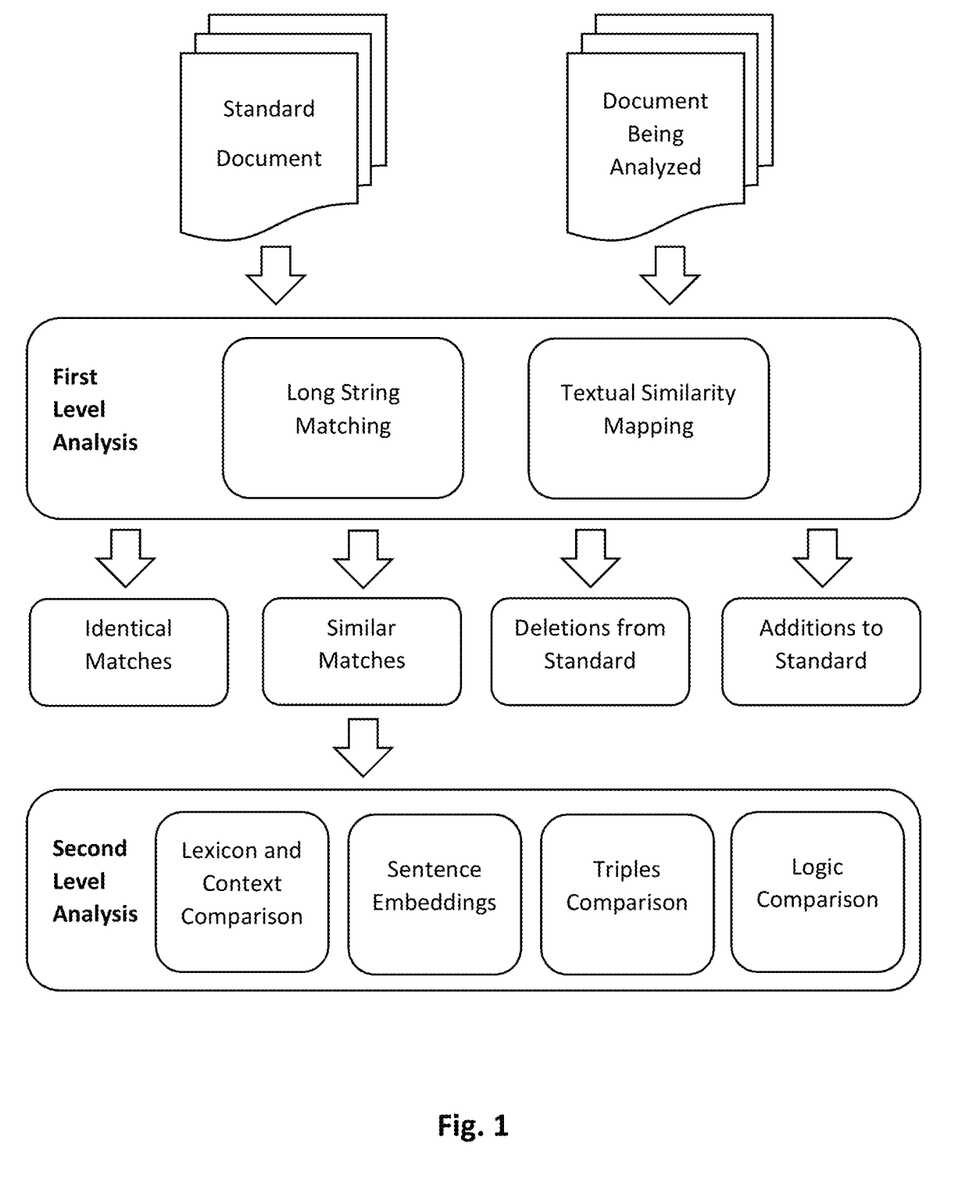
FIG. 1 is a flow chart of an exemplary process flow according to an embodiment of the present disclosure.

With the text separated into appropriate groupings, those groupings may be compared against standard text to detect deviations from the standard. FIG. 1 is a flow chart of an exemplary process flow according to an embodiment of the present disclosure. After the preliminary document formatting steps are completed, as discussed above, the standard document and the document being analyzed may be subjected to a first level analysis. As a first level of comparison, the groupings from the standard and the groupings from the document being analyzed are compared against one another to determine which groupings have identical or similar matches in the other document. As a result of such analysis, it can be determined which groupings in a standard are identically present in the document being analyzed (and the identity of those identical matches), which groupings from the standard have similar, but not identical, matches in the document being analyzed (and the identity of those similar matches), which groupings in the standard have no matching grouping in the document being analyzed (i.e. deletions from the standard) and which groupings in the document being analyzed have no matches in the standard (i.e. additions to the standard). Similar matches may be further analyzed using second level analysis techniques.

It should be noted that groupings of text within larger groupings of text may be analyzed and presented together. For example, if a standard contract clause (a grouping) contains three sentences, each of those three sentences (each its own grouping) may be analyzed independently and compared against all sentences in the document being analyzed. Accordingly, even if the standard clause contains those three sentences together in a particular order, the systems proposed herein will attempt to separately identify matching sentences in the entire document being analyzed regardless if they are found together or in a different order or even in different locations throughout the document.

In one first level comparison approach, a long string matching analysis may be performed to identify identical or mostly identical text strings from the standard in the document being analyzed or vice versa. In one example, an entire sentence from the standard may be compared against the text in the document being analyzed to determine if there are any identical strings (which may or may not comprise the entirety of a sentence in the document being analyzed) matching the standard sentence. In another example, a string comprised of predetermined number of words in the standard may be compared against the text of the document being analyzed in a similar fashion. The fixed-length string being compared from the standard may be iteratively incremented word by word within a sentence or other grouping of the standard. In each of these examples, there may be a predefined tolerance for non-matching words. For example, a similar match may be identified if a sentence from the standard matches a string from the document being analyzed with the exception of less than a predefined number of words.

The table below depicts example results of a long string matching analysis. Matching strings are identified by double parentheses (( )) and non-matching words are identified by double square brackets.

| Standard Clauses | Analyzed Clauses |
|---|---|
| ((Either party may terminate this Agreement with effect from the last day of the Initial Term or the then-current Renewal Term by giving no less than [[30]] days' written notice to the other party prior to the commencement of any Renewal Term.)) | ((Either party may terminate this Agreement with effect from the last day of the Initial Term or the then-current Renewal Term by giving no less than [[10]] days' written notice to the other party prior to the commencement of any Renewal Term.)) |
| ((Neither [[party]] can assign [[its]] rights or obligations under this Agreement without the other's prior written consent. However, prior written consent is not required if [[Thomson Reuters assigns]] this | ((Neither [[of the parties]] can assign [[their]] rights or obligations under this Agreement without the other's prior written consent. However, prior written consent is not required if [[assignment of]] this |

| Standard Clauses | Analyzed Clauses |
| --- | --- |
| Agreement[[, or portion thereof,]] to one of [[its]] Affiliates or to a third party successor-in-interest.)) This Agreement is binding upon the parties' respective successors and permitted assigns. | Agreement [[is made]] to one of [[the]] affiliates or to a third party successor-in-interest)) and the affiliate or successor agrees to be bound by the terms and conditions of this Agreement. |

In the first example, only one "word" is different between the two otherwise identical sentences. A display of the similar clauses may graphically indicate such difference to a user, such as via colored highlighting. In the second example, the first sentence of the standard clause matches (with a few exceptions) a portion of a sentence in the analyzed clause, but not the entire sentence of the analyzed clause.

In another first level comparison approach, a textual similarity mapping analysis may be performed. Such an analysis may include dividing the standard and the document to be analyzed into groupings, such as clauses and/or sentences as described above. Next, the words included in each grouping may be tokenized. A frequency analysis may be performed to identify the frequency with which each token appears in each grouping and/or within each entire document. Groupings from the standard may then be compared against groupings in the document being analyzed one by one and a similarity score may be calculated for each group pairing based on their token overlap weighted by importance, for example using a TF-IDF analysis. Such an analysis may be configured to identify portions of standard clauses that are likely missing in the document being analyzed and can similarly be configured to identify portions of clauses in the document being analyzed that do not appear in a standard clause. Further, this approach may also be configured to identify similar grouping pairs between the standard and the document being analyzed and to provide a similarity score for each grouping pair that may guide further comparisons and analysis.

Figure 2:
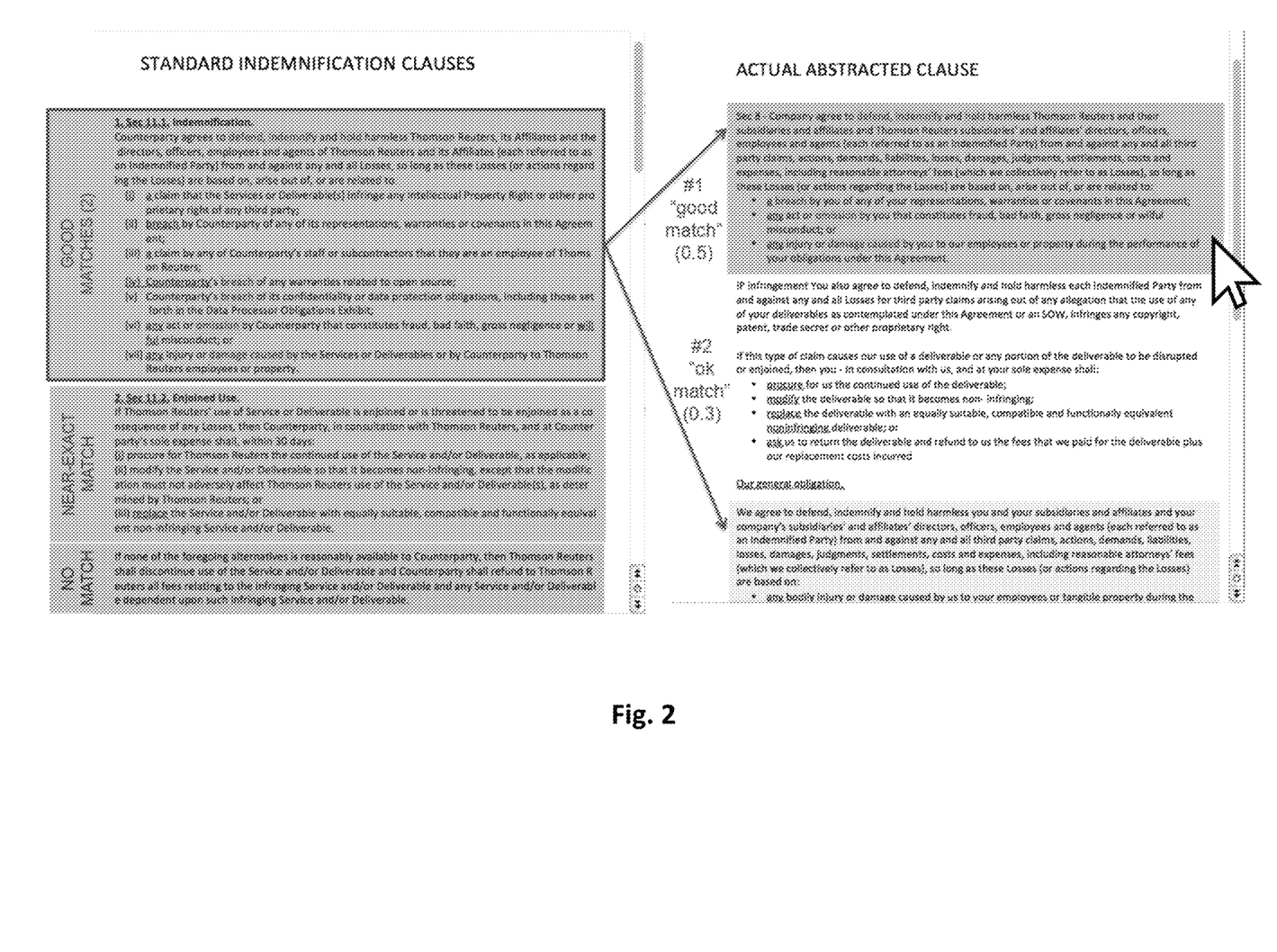
FIG. 2 is a screenshot of an exemplary user interface according to an embodiment that shows a comparison of standard indemnification clauses to a clause abstracted from a document being reviewed.

FIG. 2 is a screenshot of an exemplary user interface according to an embodiment that shows a comparison of standard indemnification clauses to a clause abstracted from a document being reviewed. As shown, first level review has indicated two potentially good matches for the first grouping in the standard, a near exact match for the second grouping in the standard and no match for the third grouping in the standard. In another aspect of FIG. 2, the two good matches in the document being analyzed are presented with similarity scores based on the output of a textual similarity mapping technique, with one similar match being "good" with a similarity score of 0.5 and the other similar match being "ok" with a similarity score of 0.3. As is also shown in FIG. 2, when a mouse cursor hovers over and/or clicks the first similar match in the document being analyzed, highlighting appears showing the matching triples identified in the standard and in the document being analyzed.

As shown in FIG. 1, when similar matches between groupings are identified as a result of a first level analysis, those similar matches may be subjected to a further, second level analysis. In one exemplary second level analysis technique, lexicon and context comparison, words, synonyms and word ordering are evaluated to determine a level of similarity. For example, lexicon comparison may include tokenizing both the standard grouping and the grouping form the document being analyzed. Tokenization may be accomplished by splitting the character sequence of each grouping at each space. Tokenization may also include stemming, reducing each word to its root form to reduce the size of the dictionary (words being compared). Tokenization may also include the technique of Ngrams, separating the groupings into sets of n (2-3, for example) words in sequence. Any of these techniques may be used alone or in combination.

For example, the table below shows similar sentences from a standard document and a document being analyzed and the result of tokenizing using a word separating technique combined with an Ngram technique with n=2.

|  | Standard Document | Document Being Analyzed |
| --- | --- | --- |
| Sentence | Non-Breaching Party may immediately terminate the Agreement by providing written notice to the Breaching Party. | Either party may terminate this Agreement immediately upon giving written notice of such termination to the other party. |
| Tokens | non-breaching party | either party |
|  | party may | party may |
|  | may immediately | may terminate |
|  | immediately terminate | terminate this |
|  | terminate the | this agreement |
|  | the agreement | agreement immediately |
|  | agreement by | immediately upon |
|  | by providing | upon giving |
|  | providing written | giving written |
|  | written notice | written notice |
|  | notice to | notice of |
|  | to the | of such |
|  | the breaching | such termination |
|  | breaching party | termination to |
|  |  | to the |
|  |  | the other |
|  |  | other party |

After tokenization, the tokens identified from the grouping in the standard document and those identified in the document being analyzed are compared. In the example given in the table above, there are three token pair matches (underlined) and there are a total of 28 unique token pairs, giving a match ratio (sometimes referred to as a Jaccard Index) of 0.107. In another example in which tokens are formed simply by dividing the sentences into words without further processing, there are 9 word pair matches between the sentences out of a total of 21 unique words, giving a match ratio of 0.429. Such low ratios generally indicate that the chances of a deviation are high. Higher token match ratios generally indicate a closer match between the text groupings being compared.

In another second level analysis technique, sentence similarity is evaluated via word embeddings. With this technique, similar sentences from the standard document and the document being analyzed are tokenized. For each sentence, representations of the tokens making up those sentences may be created using weighted aggregations of large dimension (e.g., 300) term vectors generated by language models that may be built on a neural network, for example through deep learning techniques. Such a technique is capable of identifying when the same concepts are present in both sentences even if different phrasing is used, such as in the case of word or phrase synonyms.

FIG. 3 shows an exemplary screenshot of a sentence embedding analysis according to an embodiment. As shown, the sentence embedding technique may result in an identification of similar concepts using different phraseology such as "materially breaches" and "substantial or persistent breach," "notice advising of the breach" and "notice specifying the breach," and "cured" and "remedy." The relative frequency and strength of such matches may be analyzed to determine a relative similarity between the text groupings. As shown in FIG. 3, the result of such an analysis may be depicted graphically by shading matching portions of the document being analyzed with different gradations of shading. For example, portions of the document being analyzed with a higher relative similarity may be shaded darker than those portions with a lower relative similarity.

Although FIG. 1 identifies the aforementioned sentence embeddings technique as a second layer analysis technique, it may also be used as a first layer analysis tool to measure similarity between text groupings in order to find groupings that are the closest semantic relatives between groupings in the standard document and groupings in the document being analyzed. In the same way, in a circumstance that there is no closely similar match for a text grouping, such a technique may also be configured to indicate whether that unmatched grouping is a deletion or an addition depending on whether it is present in the standard or the document being analyzed, respectively.

Another exemplary second level analysis technique is triples extraction, in which extractions of triples from similar sentences are compared. Triples may be comprised of a subject, predicate and object, for example a noun, verb and adjective. More broadly, a triple may comprise two arguments connected by a predicate.

Figure 4:
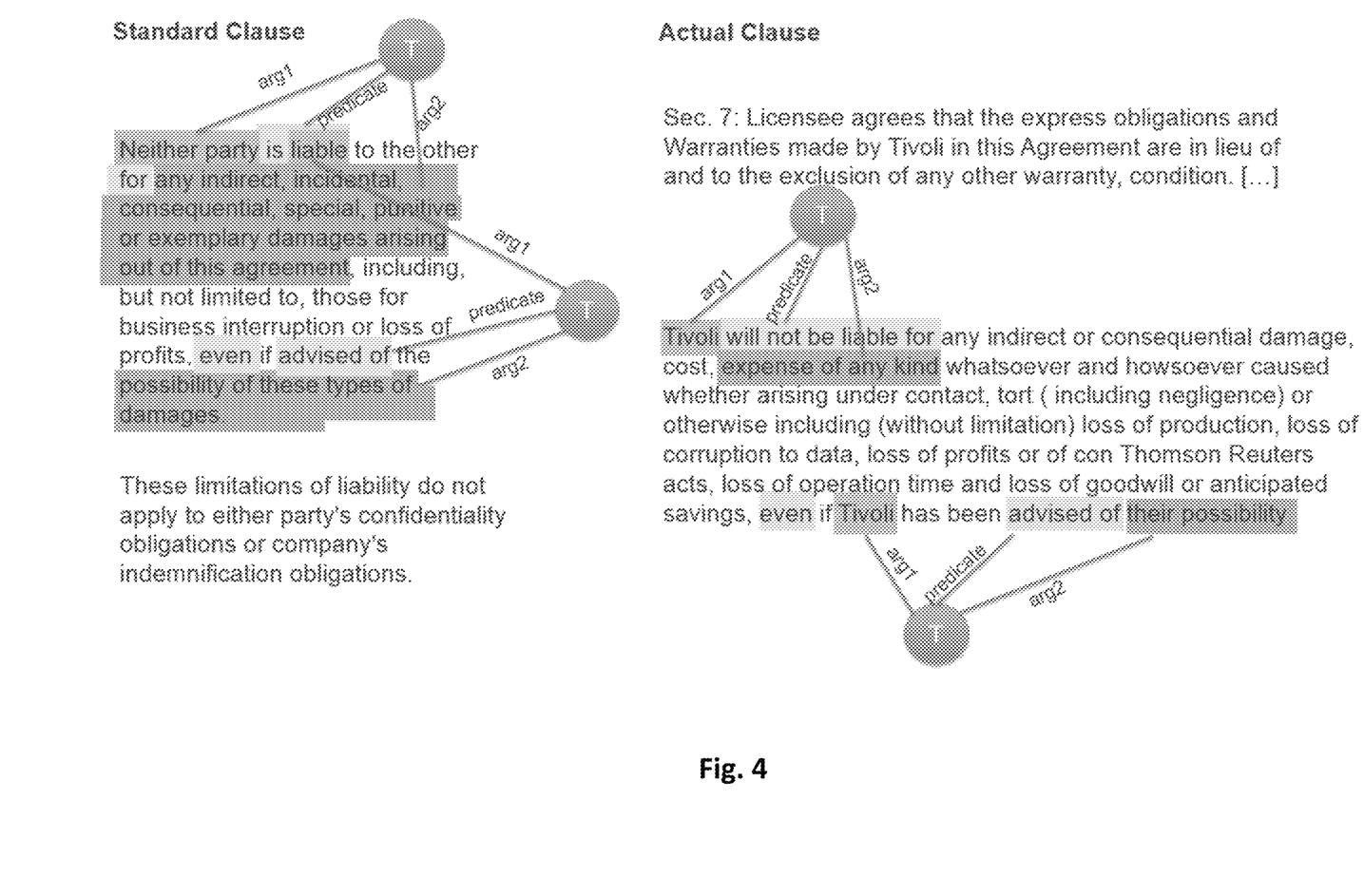
FIG. 4 is a screenshot of an exemplary user interface according to an exemplary embodiment in which triples extracted from a standard clause and triples extracted from a document being analyzed are compared.

FIG. 4 is a screenshot of an exemplary user interface according to an exemplary embodiment in which triples extracted from a standard clause and triples extracted from a document being analyzed are compared. At a high level, triples in each text grouping may be analyzed to determine which triples have similar or identical matches in the other document. Those that do not have such a match may be identified as either deletions from or additions to the standard, depending on if the unmatched triple is extracted from the standard or the document being analyzed, respectively.

For example, a first triple in the standard clause comprises "neither party" as the first argument, "is liable . . . for" as the predicate and "any indirect, incidental, consequential, special, punitive or exemplary damages arising out of this agreement" as the second argument. This triple may be compared against the first triple of the clause in the document being analyzed, which is comprises "Tivoli" as the first argument, "will not be liable for" as the second argument" and "expense of any kind" as the second argument. In each of these triples, "liable" is present in the predicate, a noun is present in the first argument and the second arguments concern "damages" and an "expense," which may be identified as semantically similar. Accordingly, the first triple pair may be considered similar.

In the second triple in the standard clause, "liable is identified as the first argument, "even . . . advised of" is identified as the predicate, and "possibility of these types of damages" is identified as the second argument. In the document being analyzed, the second triple comprises "Tivoli" as the first argument, "even . . . advised of" as the predicate and "their possibility" as the second argument. In comparing theses triples, the predicates are the same and the second arguments both contain the word "possibility." However, in the second triple of the standard clause, the first argument is "liable," which is used as an adjective. Conversely, in the second triple of the clause in the document being analyzed, the first argument is a noun, and a proper noun at that. Nevertheless, because of the similarities between the predicates and the second arguments, such a triple pair would be identified as potentially similar.

In another second level analysis technique, dependency parsing and logic abstraction, the logic between text groupings in the standard and text groupings in the document being analyzed is compared. As a first stage, dependencies between parts of speech in a sentence are detected and analyzed. Common parts of speech include verbs, nouns, adjectives, etc. Then, logic is abstracted from text groupings. For example, "Socrates is a man" and "every man dies eventually" may be abstracted to logically deduce that "Socrates dies eventually."

Figure 5:
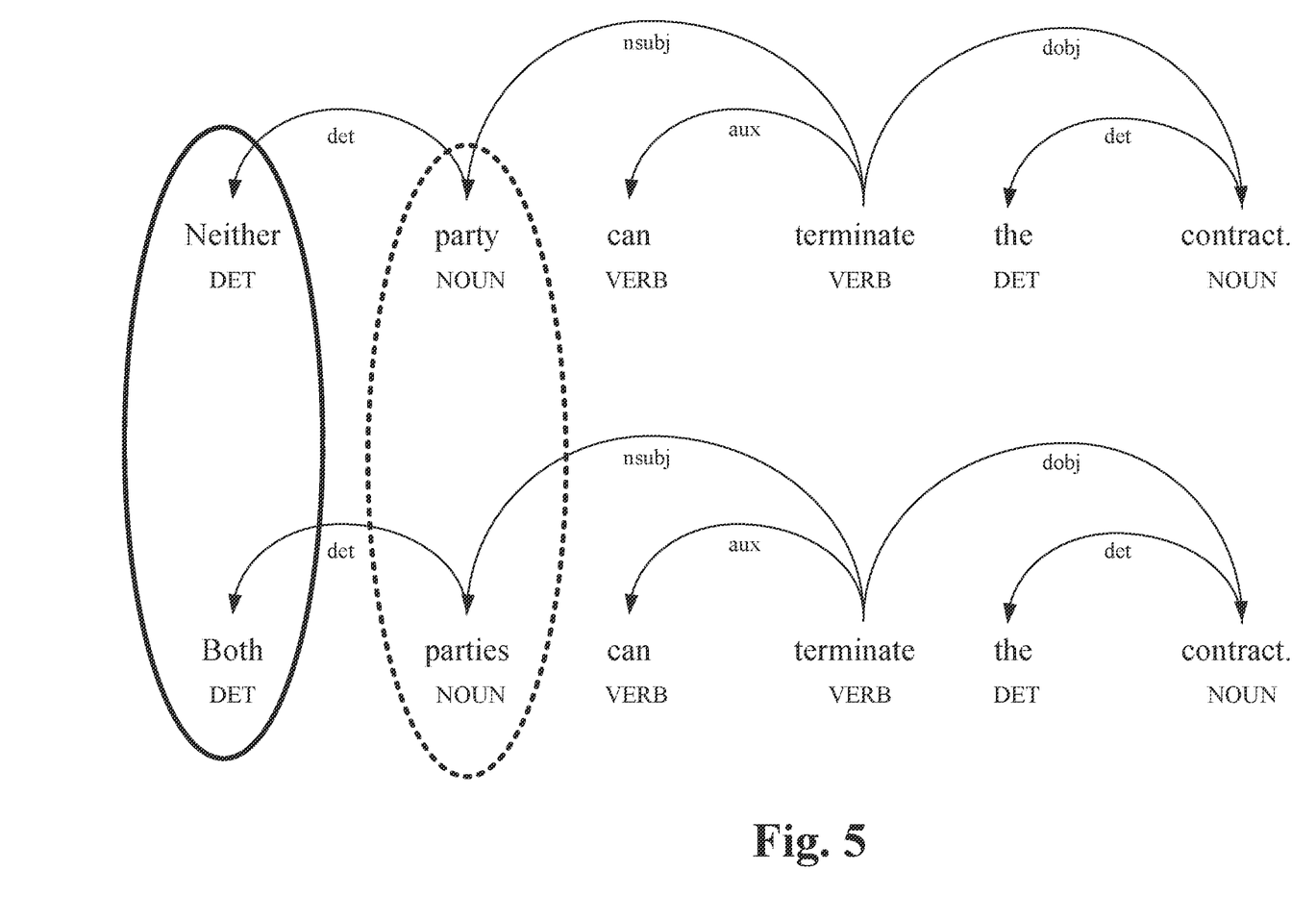
FIG. 5 depicts an example of a logical comparison of two sentences according to an exemplary embodiment.

FIG. 5 depicts an example of a logical comparison of two sentences according to an exemplary embodiment. In this example, the sentence in the standard document is "Neither party can terminate the contract" and the similar sentence in the document being analyzed is "Both parties can terminate the contract." As a first step of the analysis, parts of speech in each sentence are detected and analyzed. In this example, the parts of speech and even their order are identical in both sentences. Next, dependencies among the parts of speech are analyzed. Here, again, the dependencies are the same. Next, logical abstractions are performed on the sentences. For example, in the sentence from the standard document, "neither" is abstracted to "there exists no one." Similarly, in the sentence from the document being analyzed, "both" is abstracted to "there exist two ones." A comparison of these logical abstractions reveals the fundamental difference, or negation, between the two otherwise very similar sentences. In a similar process, negations in more complex sentences with discourses may be detected by building up a hierarchy of discourses and the propagating through the logical statements from the bottom up.

The different second layer analysis tools described above may be used selectively, and together or separately. In one embodiment, the different tools may be employed (or not) to analyze similar text groupings depending on the level of similarity detected by the first layer analysis tools. For example, grouping pairs with extremely high similarities as determined by the first layer analysis may not be subjected to second layer analysis at all, instead being labeled nearly identical. Grouping pairs with moderately high similarities may be subjected to a triples extraction analysis to identify triples or spans of text, such as noun phrases, that are similar between the documents to guide the analysis, even if the entire text grouping from the standard or the document being analyzed does not match an entire text grouping from the other document. Finally, groupings with questionable similarity may be subjected to dependency parsing and negation analysis techniques to further identify evidence of similarity.

The systems and methods described herein may be embodied in a standalone system, a deviation detection accessible by other systems or any combination. For example, in a standalone system embodiment, the deviation detection tools may be comprised in a standalone application residing on a user's computing device or accessed vie a network or internet link from the user's device. Such a standalone application may be configured to obtain standard documents such as standard playbooks or standard contracts from a contract analytics tool or other library through a web, network and/or API link, for example. Such an application may be configured to create user dashboards, visualizations and detection result exports. Such an application may be configured to interact with another application configured to perform any of the steps described herein. For example, an application such as eBrevia may be accessed by a standalone application according to the current disclosure through an API to perform text extraction, fact extraction and abstraction steps.

The systems and methods described herein may also be embodied in a deviation detection service accessible to other applications via a web, network or API link. For example, a workflow tool or contract evaluation tool may be configured to access a deviation detection service independently of each other, but both being connected to the deviation detection service via an API. IN such an embodiment, a deviation detection service may be configured to take as inputs a standard text grouping and a text grouping from a document being analyzed and may return as an output deviation detection results in the form of a similarity score.

FIGS. 1 through 5 are conceptual illustrations allowing for an explanation of the present disclosure. It should be understood that various aspects of the embodiments of the present disclosure could be implemented in hardware, firmware, software, or combinations thereof. In such embodiments, the various components and/or steps would be implemented in hardware, firmware, and/or software to perform the functions of the present disclosure. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the disclosure as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; or the like.

Notably, the figures and examples above are not meant to limit the scope of the present disclosure to a single embodiment, as other embodiments are possible by way of interchange of some or all of the described or illustrated elements. Moreover, where certain elements of the present disclosure can be partially or fully implemented using known components, only those portions of such known components that are necessary for an understanding of the present disclosure are described, and detailed descriptions of other portions of such known components are omitted so as not to obscure the disclosure. In the present specification, an embodiment showing a singular component should not necessarily be limited to other embodiments including a plurality of the same component, and vice-versa, unless explicitly stated otherwise herein. Moreover, the applicants do not intend for any term in the specification or claims to be ascribed an uncommon or special meaning unless explicitly set forth as such. Further, the present disclosure encompasses present and future known equivalents to the known components referred to herein by way of illustration.

The foregoing description of the specific embodiments so fully reveals the general nature of the disclosure that others can, by applying knowledge within the skill of the relevant art(s), readily modify and/or adapt for various applications such specific embodiments, without undue experimentation, without departing from the general concept of the present disclosure. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

In order to address various issues and advance the art, the entirety of this application for SYSTEMS AND METHODS FOR DOCUMENT DEVIATION DETECTION (including the Cover Page, Title, Abstract, Headings, Cross-Reference to Related Application, Background, Brief Summary, Brief Description of the Drawings, Detailed Description, Claims, Figures, and otherwise) shows, by way of illustration, various embodiments in which the claimed innovations may be practiced. The advantages and features of the application are of a representative sample of embodiments only, and are not exhaustive and/or exclusive. They are presented only to assist in understanding and teach the claimed principles. It should be understood that they are not representative of all claimed innovations. As such, certain aspects of the disclosure have not been discussed herein. That alternate embodiments may not have been presented for a specific portion of the innovations or that further undescribed alternate embodiments may be available for a portion is not to be considered a disclaimer of those alternate embodiments. It will be appreciated that many of those undescribed embodiments incorporate the same principles of the innovations and others are equivalent. Thus, it is to be understood that other embodiments may be utilized and functional, logical, operational, organizational, structural and/or topological modifications may be made without departing from the scope and/or spirit of the disclosure. As such, all examples and/or embodiments are deemed to be non-limiting throughout this disclosure. Also, no inference should be drawn regarding those embodiments discussed herein relative to those not discussed herein other than it is as such for purposes of reducing space and repetition. For instance, it is to be understood that the logical and/or topological structure of any combination of any program components (a component collection), other components and/or any present feature sets as described in the figures and/or throughout are not limited to a fixed operating order and/or arrangement, but rather, any disclosed order is exemplary and all equivalents, regardless of order, are contemplated by the disclosure. Furthermore, it is to be understood that such features are not limited to serial execution, but rather, any number of threads, processes, services, servers, and/or the like that may execute asynchronously, concurrently, in parallel, simultaneously, synchronously, and/or the like are contemplated by the disclosure. As such, some of these features may be mutually contradictory, in that they cannot be simultaneously present in a single embodiment. Similarly, some features are applicable to one aspect of the innovations, and inapplicable to others. In addition, the disclosure includes other innovations not presently claimed. Applicant reserves all rights in those presently unclaimed innovations including the right to claim such innovations, file additional applications, continuations, continuations in part, divisions, and/or the like thereof. As such, it should be understood that advantages, embodiments, examples, functional, features, logical, operational, organizational, structural, topological, and/or other aspects of the disclosure are not to be considered limitations on the disclosure as defined by the claims or limitations on equivalents to the claims. It is to be understood that, depending on the particular needs and/or characteristics of an individual and/or enterprise user, database configuration and/or relational model, data type, data transmission and/or network framework, syntax structure, and/or the like, various embodiments may be implemented that enable a great deal of flexibility and customization. While various embodiments and discussions have included reference to applications in the legal context, and more specifically in the context of contract review, it is to be understood that the embodiments described herein may be readily configured and/or customized for a wide variety of other applications and/or implementations.

What is claimed is:

1. A system comprising memory and one or more processors communicatively coupled to the memory, the one or more processors configured to:
    determine a deviation between a document and a standard document based on a long string matching analysis configured to obtain an identification of at least one of any identical groupings of text, any similar groupings of text, any groupings of text in the document that have been deleted from the standard document, and any groupings of text in the document that have been added to the standard document,
    wherein the long string matching analysis is configured to iteratively increment a string of text from a text grouping from the standard document in a word by word manner within the text grouping such that each string of text within the text grouping is compared between the standard document and the document;
    modify, based on the long string matching analysis, one or more visual characteristics of the document to generate a modified version of the document;
    compare a deviation detected in the document from the standard document to an accepted deviation previously identified from the standard document in one or more previous documents; and
    cause rendering of an interactive graphical interface element associated with the modified version of the document via a user interface of a user computing device, wherein the interactive graphical interface element is configured to (i) display visualization data associated with the modified version of the document, (ii) indicate whether a deviation detected in the document from the standard document has been previously accepted, and (iii) dynamically alter the visualization data based on user input received via the user interface.

2. The system of claim 1, wherein the one or more processors are further configured to:
    determine standard document based on the type of the first document.

3. The system of claim 1, wherein the one or more processors are further configured to:
    determine the deviation between the document and the standard document based on a deviation analysis with respect to any similar groupings of text that are identified to obtain similarity data indicating a degree to which the text grouping from the standard document is similar to a text grouping from the document.

4. The system of claim 3, wherein the one or more processors are further configured to:
    modify the one or more visual characteristics of the document based on the deviation analysis.

5. The system of claim 1, wherein the one or more processors are further configured to:
    perform a textual similarity mapping analysis that compares a number of shared tokens between the text grouping from the standard document and a text grouping from the document.

6. The system of claim 5, wherein the one or more processors are further configured to:
    modify the one or more visual characteristics of the document based on the textual similarity mapping analysis.

7. The system of claim 1, wherein the one or more processors are further configured to:
    perform a textual similarity mapping analysis that compares a number of unique tokens among the text grouping from the standard document and a text grouping from the document.

8. The system of claim 7, wherein the one or more processors are further configured to:
    modify the one or more visual characteristics of the document based on the textual similarity mapping analysis.

* * * * *